(12) United States Patent
Chow et al.

(10) Patent No.: US 8,709,366 B2
(45) Date of Patent: Apr. 29, 2014

(54) CONFIGURATIONS AND METHODS FOR EFFLUENT GAS TREATMENT

(75) Inventors: Thomas King Chow, Irvine, CA (US); Vincent Wai Wong, Hacienda Heights, CA (US); John Gebur, El Monte, CA (US); Theresa Flood, Mission Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1022 days.

(21) Appl. No.: 11/578,358

(22) PCT Filed: Nov. 9, 2004

(86) PCT No.: PCT/US2004/037556
§ 371 (c)(1),
(2), (4) Date: Jun. 9, 2008

(87) PCT Pub. No.: WO2005/108286
PCT Pub. Date: Nov. 17, 2005

(65) Prior Publication Data
US 2008/0279758 A1    Nov. 13, 2008

Related U.S. Application Data

(60) Provisional application No. 60/581,923, filed on Jun. 21, 2004, provisional application No. 60/588,216, filed on Jul. 14, 2004, provisional application No. 60/589,528, filed on Jul. 19, 2004.

(30) Foreign Application Priority Data

Apr. 22, 2004 (WO) ................ PCT/US2004/012599

(51) Int. Cl.
*C01B 17/04* (2006.01)
*C01B 17/16* (2006.01)
*B01D 53/48* (2006.01)

(52) U.S. Cl.
USPC ...... 423/224; 422/171; 423/244.09; 423/564; 423/574.1

(58) Field of Classification Search
USPC ................ 422/168, 169, 170, 171, 172, 182; 423/220, 224, 230, 244.01, 244.09, 423/564, 574.1, 576, 576.8
See application file for complete search history.

(56) References Cited

U.S. PATENT DOCUMENTS

| | | | | |
|---|---|---|---|---|
| 3,579,302 A | * | 5/1971 | Sefton | 423/576 |
| 3,758,676 A | * | 9/1973 | Goddin et al. | 423/576 |
| 4,041,130 A | * | 8/1977 | Mackles | 423/220 |
| 4,085,199 A | | 4/1978 | Singleton et al. | |
| 4,192,857 A | * | 3/1980 | Tellier et al. | 423/576 |

(Continued)

FOREIGN PATENT DOCUMENTS

EP    0718026    6/1996

*Primary Examiner* — Jill Warden
*Assistant Examiner* — Joye L Woodard
(74) *Attorney, Agent, or Firm* — Fish & Tsang, LLP

(57) ABSTRACT

Sulfur oxides are removed from an oxygen-containing acid gas in configurations and methods in which oxygen is catalytically removed using hydrogen sulfide, and in which the sulfur oxides react with the hydrogen sulfide to form elemental sulfur. A first portion of the remaining sulfurous compounds is reduced to form the hydrogen sulfide for oxygen removal, while a second portion of the sulfurous compounds is further converted to elemental sulfur using a Claus reaction or catalytic direct reduction reaction.

11 Claims, 3 Drawing Sheets

(56) References Cited

U.S. PATENT DOCUMENTS

| | | |
|---|---|---|
| 4,406,873 A | 9/1983 | Beavon |
| 4,797,268 A | 1/1989 | McGovern et al. |
| 4,798,716 A * | 1/1989 | Palm .......................... 423/574.1 |
| 4,908,201 A | 3/1990 | Cabanaw |
| 5,352,433 A | 10/1994 | Watson |
| 5,366,717 A * | 11/1994 | Dorchak et al. .............. 423/570 |
| 5,468,458 A * | 11/1995 | Watson ......................... 423/222 |
| 5,514,351 A | 5/1996 | Buchanan et al. |
| 5,766,567 A * | 6/1998 | Voirin et al. ................ 423/574.1 |
| 5,804,153 A * | 9/1998 | Fang et al. ................. 423/242.1 |
| 6,444,185 B1 | 9/2002 | Nougayrede et al. |

\* cited by examiner

CONFIGURATIONS AND METHODS FOR EFFLUENT GAS TREATMENT

This application claims the benefit of our copending provisional patent applications with the Ser. Nos. 60/581,923 (filed Jun. 21, 2004), 60/588,216 (filed Jul. 14, 2004), and 60/589,528 (filed Jul. 19, 2004), and International patent application with the serial number PCT/US04/12599 (filed Apr. 22, 2004), all of which are incorporated by reference herein.

FIELD OF THE INVENTION

The field of the invention is treatment of effluent gases, and especially removal of sulfur dioxide from oxygen-containing gases.

BACKGROUND OF THE INVENTION

Currently known processes for sulfur dioxide from oxygen-containing gases typically employ caustic processes (e.g., Amerex, Belco, Croll-Reynolds, Envirochem, Turbosonic), or non-caustic processes (e.g., Cansolv, ClausMaster, CrystaTech). While the capital investment for a caustic process is generally low, operating and disposal costs may be prohibitively expensive. On the other hand, all or almost all of the currently known non-caustic processes are more capital intensive and are frequently not commercially proven.

For example, sulfur dioxide is removed in some of the known configurations using a caustic process in which gaseous sulfur compounds are converted into soluble sulfite/sulfate compounds. Typical examples of such configurations are shown in U.S. Pat. Nos. 3,719,742 to Terrana et al. and 3,790,660 to Earl et al. However, most of such configurations have a relatively high stripping steam requirement and are therefore economically less attractive. Other known caustic processes are described, for example, in U.S. Pat. No. 3,920,794 to La Mantia et al. Here, NaOH and $Na_2CO_3$ scrubbing solutions remove $SO_2$ from gas streams. After the adsorption or scrubbing step, an oxidation step is performed to convert sulfites to sulfates by addition of catalytically effective metals (e.g., Fe, Cu, Co, Mn, and/or Ni). While such oxidation is relatively simple and effective, salts need to be added, and a secondary oxidation step may be required, especially where the level of sulfites in the scrubbing solution after adsorption of $SO_2$ is relatively high.

To overcome at least some of the problems associated with caustic solutions, various alkanolamines (e.g., aqueous solutions of triethanolamine) can be used to absorb $SO_2$ from a waste gas as described for example, in U.S. Pat. No. 3,904,735 to Atwood et al. However, several difficulties remain. Among other things, many alkanolamines have a relatively low selectivity towards $SO_2$ and tend to absorb significant quantities of $CO_2$. Still further, at least some of the alkanolamines exhibit relatively high evaporative losses and often promote oxidation of $SO_2$ to $SO_3$ where oxygen is present.

In still further known non-caustic processes, as described in U.S. Pat. No. 4,634,582 to Sliger et al., $SO_2$ is removed from a waste gas stream by absorption in a buffered aqueous thiosulfate and polythionate solution, followed by regeneration of the enriched solution with hydrogen sulfide to form sulfur. Hydrogen sulfide recovered from the regeneration step is then introduced to the absorption step to reduce bisulfite concentration in the enriched solution. While such desulfurization is conceptually relatively simple, maintenance of the buffered solution often limits the capacity of such systems in at least some instances.

Alternatively, as described in our International patent application (published as WO 03/045544), sulfur dioxide-containing waste gas is introduced into a reducing gas generator that is operated using natural gas, air, and hydrogen to supply sufficient reducing gas to the effluent gas. Typical operation conditions are selected such that the oxygen is substantially completely removed from the waste gas, operation temperatures will generally be between about 1000° and 1500° F. The so formed hydrotreated feed gas comprises hydrogen sulfide, which is removed using a contactor. Such configurations advantageously improve sulfur removal under most conditions. However, high temperature operation and supplemental fuel gas are generally needed, which tends to increase cost and complexity of the operation.

Thus, although numerous configurations and methods are known in the art to reduce sulfur concentrations in oxygen-containing effluent streams, all or almost all of them suffer from one or more disadvantages. Therefore, there is still a need to provide improved methods and configuration to reduce the sulfur content in such streams.

SUMMARY OF THE INVENTION

The present invention is directed to configurations and methods of sulfur removal from oxygen-containing acid gases, wherein oxygen is removed in a first catalytic reaction using hydrogen sulfide, preferably from a recycle gas stream. Hydrogen sulfide may also react with the sulfur dioxide to form elemental sulfur in the same catalytic bed. Elemental sulfur formed in the catalytic bed is removed, and remaining sulfurous compounds are reacted in a second and third reaction forming the hydrogen sulfide (recycle gas) and further elemental sulfur, respectively.

In one especially preferred aspect, a plant includes a first catalytic reactor that receives a hydrogen sulfide recycle stream and an oxygen-containing acid gas comprising sulfur dioxide. Preferably, the first catalytic reactor is configured to catalytically consume the oxygen using the hydrogen sulfide recycle stream to thereby form an oxygen depleted, or even oxygen free hydrogen sulfide/sulfur dioxide enriched stream (preferably using an alumina, titanium oxide, vanadium-antimony catalyst and/or any direct oxidation catalysts). A second catalytic reactor is fluidly coupled to the first catalytic reactor and configured to produce elemental sulfur from a first portion of the oxygen depleted hydrogen sulfide/sulfur dioxide enriched stream, and a third catalytic reactor is fluidly coupled to the first catalytic reactor and optionally second catalytic reactor, and configured to produce the hydrogen sulfide recycle stream from a second portion of the oxygen depleted hydrogen sulfide/sulfur dioxide enriched stream.

In preferred aspects of the inventive subject matter, a sulfur condenser is located downstream of the first and/or second catalytic reactor, and contemplated plants may further include a reducing gas generator that is coupled to the third catalytic reactor and that provides hydrogen and reducing gas to third catalytic reactor and/or the second portion of the oxygen depleted hydrogen sulfide/sulfur dioxide enriched stream. Where concentration of the hydrogen sulfide recycle stream is desired, the plant may further include an absorber and regenerator coupled to the third catalytic reactor, wherein a solvent (most preferably amine solvent) in the absorber absorbs hydrogen sulfide from an effluent of the third catalytic reactor, and wherein the regenerator regenerates the solvent to thereby produce the concentrated hydrogen sulfide recycle stream.

Depending on the particular configuration, inert gas may be vented from the absorber or a sulfur condenser that removes sulfur from the effluent of the second catalytic reactor. Furthermore, it should be recognized that the second reactor may be configured to operate as a Claus reactor or a direct reduction reactor in which sulfur trioxide, sulfur dioxide, hydrogen sulfide, and other sulfurous compounds are catalytically reduced to elemental sulfur.

In another especially preferred aspect, a method of treating an acid gas includes one step in which an oxygen-containing acid gas comprising sulfur dioxide is catalytically converted to an oxygen-depleted gas using hydrogen sulfide from a recycle gas. In another step, a first portion of the oxygen-depleted gas is catalytically converted to elemental sulfur, while in yet another step a second portion of the oxygen depleted gas is catalytically converted to thereby form the recycle gas.

In especially preferred methods, the step of converting the first portion of the oxygen-depleted gas may comprise a Claus reaction or a catalytic direct reduction in which sulfur trioxide, sulfur dioxide, hydrogen sulfide, and other sulfurous compounds are catalytically reduced to elemental sulfur. Additionally, it is contemplated that after the step of catalytically converting the second portion of the oxygen depleted gas, inert gas is removed to thereby form the recycle gas Various objects, features, aspects and advantages of the present invention will become more apparent from the accompanying drawing and the following detailed description of preferred embodiments of the invention.

DETAILED DESCRIPTION

The inventors have discovered that sulfur dioxide can be effectively removed from oxygen-containing acid gases in a plant configuration in which the oxygen is first catalytically removed (i.e., consumed in a catalyzed reaction) using hydrogen sulfide, and in which sulfur is produced from one portion of the oxygen-depleted acid gas, and hydrogen sulfide is formed from another portion of the oxygen-depleted acid gas (which is preferably used as a recycle stream in the oxygen removal reaction).

Viewed from another perspective, elemental sulfur is catalytically produced in a Claus reaction from sulfur dioxide of the acid gas using a hydrogen sulfide recycle stream while at the same time removing oxygen. The so formed elemental sulfur is then removed in a sulfur condenser, and a first portion of the remaining sulfur dioxide is catalytically reduced to hydrogen sulfide (e.g., using hydrogen or carbon monoxide) to form the hydrogen sulfide recycle stream. A second portion of the remaining sulfur dioxide is catalytically converted to hydrogen sulfide, which may be reacted to additional elemental sulfur in a Claus reaction or direct reduction reaction.

Therefore, the inventors generally contemplate a plant that includes a first catalytic reactor that receives a hydrogen sulfide recycle stream and an oxygen-containing acid gas comprising sulfur dioxide, wherein the first catalytic reactor is configured to catalytically consume the oxygen using the hydrogen sulfide recycle stream to thereby form an oxygen depleted hydrogen sulfide/sulfur dioxide enriched stream. A second catalytic reactor is fluidly coupled to the first catalytic reactor and configured to produce elemental sulfur from a first portion of the oxygen depleted hydrogen sulfide/sulfur dioxide enriched stream, while a third catalytic reactor is fluidly coupled to the first and optionally second catalytic reactor and configured to produce the hydrogen sulfide recycle stream from a second portion of the oxygen depleted hydrogen sulfide/sulfur dioxide enriched stream. The term "oxygen depleted" as used herein refers to an oxygen content of less than 2 vol %, more typically less than 1 vol %, and most typically less than 0.01 vol %.

Figure 1:
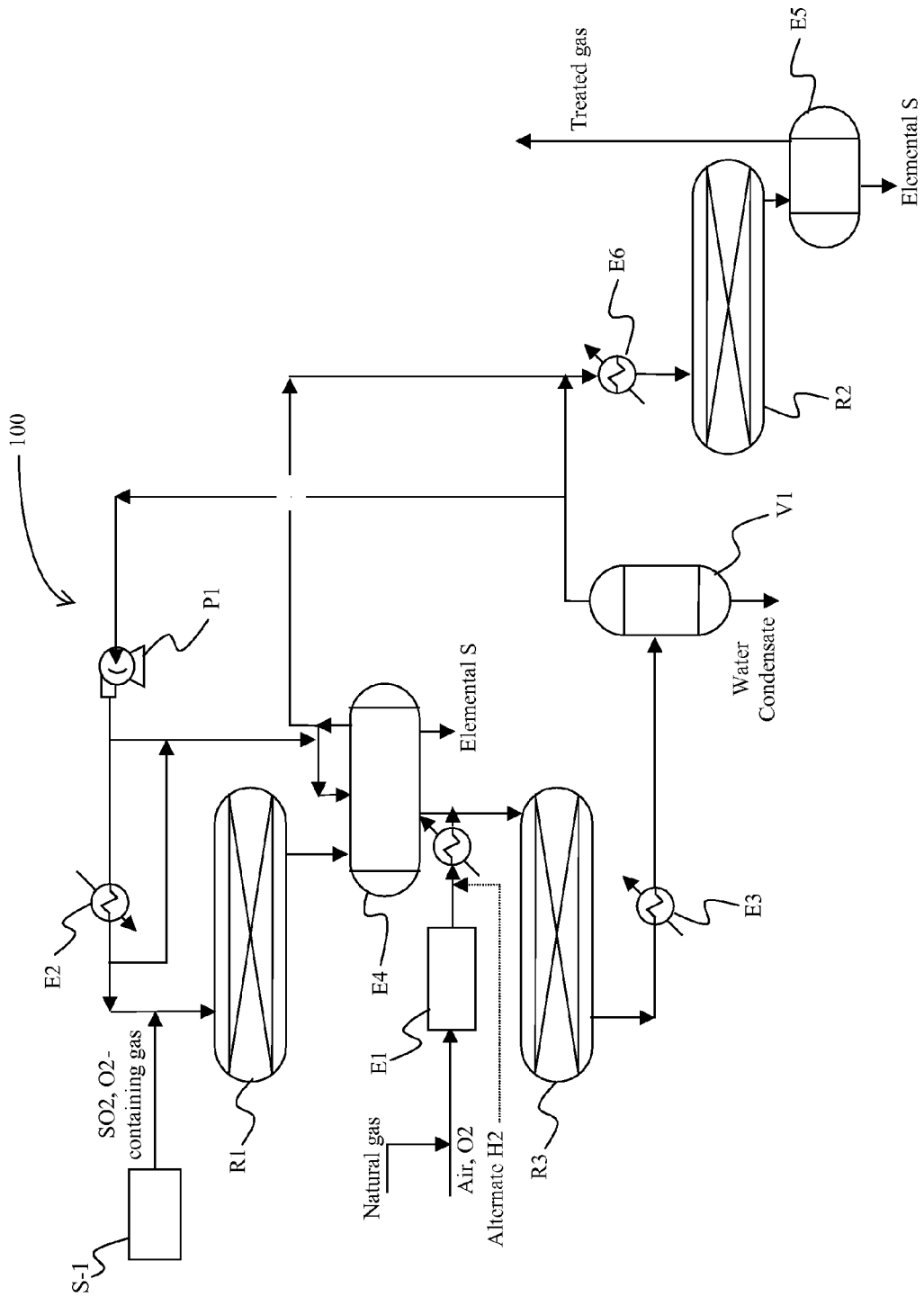
FIG. 1 is an exemplary configuration of a desulfuration plant in which the second catalytic reactor is operated as a Claus reactor.

In one preferred aspect of the inventive subject matter, as exemplarily depicted in FIG. 1, the second catalytic reactor is operated as a Claus reactor. A first fraction of the oxygen-depleted gas from the first catalytic reactor leaves that plant as a vent stream from a downstream sulfur condenser that receives the Claus reactor effluent, while a second fraction of the oxygen-depleted gas from the first catalytic reactor is recycled to the first reactor via the third reactor.

Here, SO2 and oxygen containing gases from a source S-1 of oxygen-containing acid gas comprising sulfur dioxide (e.g., regenerator off gases from ConocoPhillips S Zorb Desulfurization processes, FCC flue gases, coker flue gases, smelter furnace off-gases, and/or power plant flue gases) at about (or pre-heated to about) 400-600° F. are introduced into an oxygen eliminator/sulfur converter R-1. H2S containing gas is recycled into R1 from downstream knockout drum V-1 via pump P1 and preheater E-2, in which the H2S containing gas is preheated to about 400-600° F. prior to entering the oxygen eliminator/sulfur converter R 1. In the oxygen eliminator/sulfur converter R1, oxygen is catalytically reacted with H2S to form H2O and SO2. It should be noted that some of the SO2 will catalytically react with H2S to form elemental sulfur in accordance with the Claus reaction. The operating temperature range in R-1 is preferably between 350° F. and 800° F. It should further be appreciated that the amount of H2S in the recycled gas from V-1 can be adjusted to allow removal of all oxygen and at the same time to promote maximum reaction of H2S with SO2 (within the operating temperature limitation of the catalyst).

With respect to the catalysts in the first catalytic reactor, it is generally contemplated that all materials that catalytically consume oxygen in a reaction with hydrogen sulfide are deemed suitable for use herein. Furthermore, preferred catalysts will also catalyze to at least some extent a Claus reaction in which $H_2S$ and $SO_2$ form, among other products, elemental sulfur. Therefore, particularly preferred catalysts include various alumina catalysts, titanium oxide catalysts, vanadium-antimony catalysts, and any direct oxidation catalysts.

The so produced oxygen-depleted gas is cooled in sulfur condenser E-4 to allow recovery of elemental sulfur that was formed in R-1. A first portion of the sulfur condenser effluent is directed to a downstream Claus Reactor R-2 and mixed with a portion of the hydrogen sulfide-containing recycle stream from the drum V-1 (mixing is preferably performed prior to entering the Claus Reactor R-2), while a second portion is mixed with a hot hydrogen and carbon monoxide containing gas from either a Reducing Gas Generator E-1 or an alternate hydrogen source prior to entering R-3. The cooler between E-1 and R-3 can act as an effluent cooler for E-1 or as a preheater for the hydrogen stream from an alternate source to form a combined gas stream having a temperature range of 400° F.-600° F. to facilitate the catalytic reaction in the hydrogenation reactor R-3. The hydrogen and/or carbon monoxide containing gas stream introduced into R-3 is to facilitate the direct hydrogenation reactions of SO2, sulfur vapor and other sulfur constituents. The operating temperature range in R-3 is typically between 400° F. and 850° F.

The amount of recycle gas from the knockout drum V-1 is preferably controlled to yield an operating temperature of the R-3 gas effluent at 600° F.-850° F. to ensure catalytic hydrogenation of $SO_2$, elemental sulfur vapor, and other sulfur constituents to $H_2S$ in the presence of hydrogen and carbon monoxide. There are numerous catalysts for hydrogenation of sulfur compounds known in the art, and all of the known catalysts are deemed suitable for use herein. For example, appropriate catalysts include iron/gamma alumina and CoMo catalysts. The effluent from R-3 is then cooled in the Gas Effluent Cooler E-3, typically via steam generation, and water condensate is removed via knockout drum V-1. Of course, it should be recognized that (where desirable) E-3 and V-1 could be combined to a direct contact condenser.

A portion of the cooled gas stream leaving E-3, predominantly comprising $H_2S$, is mixed with the oxygen free effluent gas from the Sulfur Condenser E-4 and the combined stream is reheated to about 400° F.-440° F. in reheater E-6 prior to entering the Claus Reactor R-2. $H_2S$ reacts with $SO_2$ in accordance with the Claus reaction in reactor R-2 to form elemental sulfur, which is then removed via sulfur condenser E-5. It should be noted that the cooled gas effluent from E-5 could be fed into a subsequent Claus stage, to an incinerator, and/or stack, depending on the desired overall sulfur recovery. The balance of the overhead effluent of V-1 is recycled via a Recycle Compressor P-1 for the upstream operation of R-1 and R-3.

Figure 2:
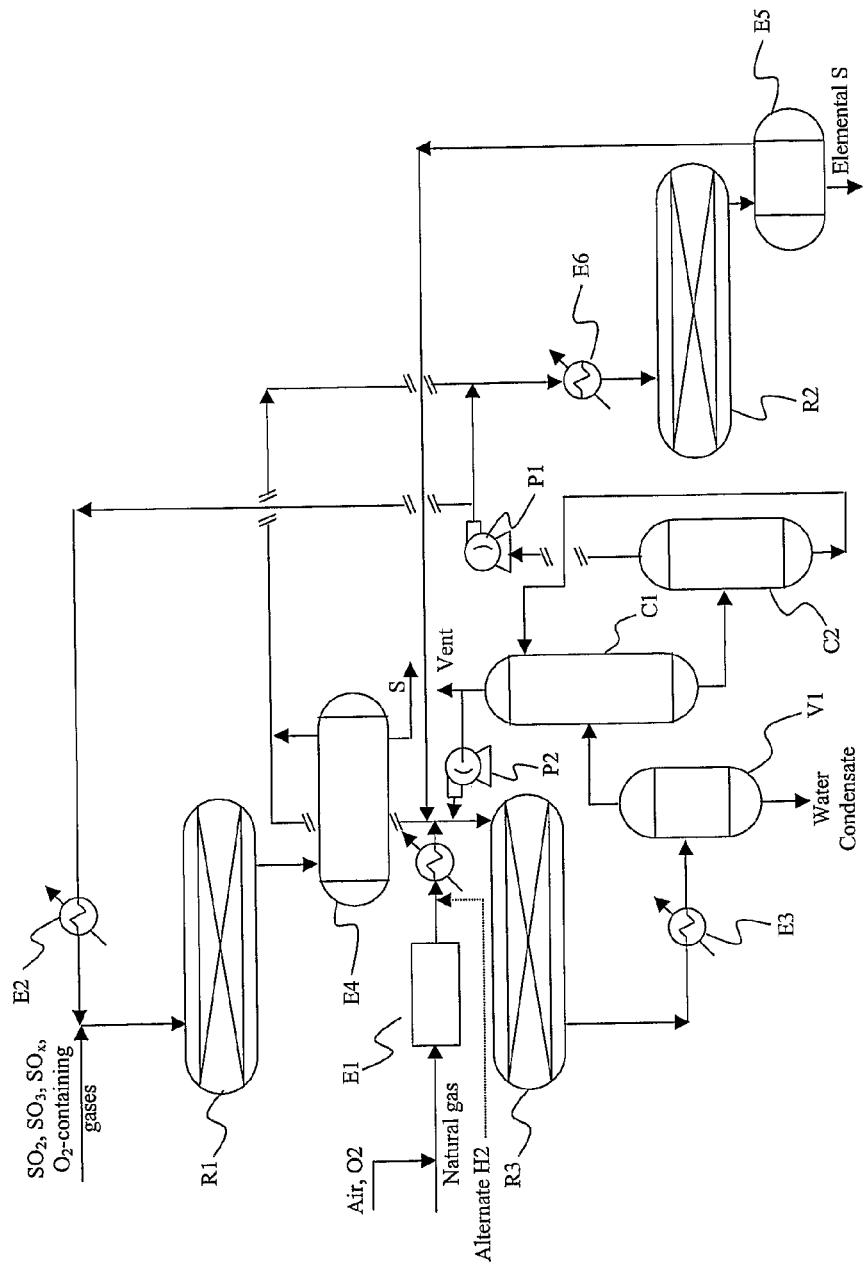
FIG. 2 is an exemplary configuration of a desulfuration plant in which the second catalytic reactor is operated as a Claus reactor, in which inert gas is removed via an absorber, and in which recycle gas is concentrated via an absorber/regenerator.

In another preferred aspect of the inventive subject matter, as exemplarily depicted in FIG. 2, the second catalytic reactor is operated as a Claus reactor, and desulfurized gas is separated and vented via an absorber/regenerator circuit, while the vapors from the second catalytic reactor are fed to the third catalytic reactor. The hydrogen sulfide recycle stream is provided by the third reactor.

Here, $SO_2$, $SO_3$, and oxygen containing gases at about, or pre-heated to about 400° F. to 600° F. are introduced into an oxygen eliminator/sulfur converter R-1. $H_2S$ containing gas is recycled from the amine regenerator C-2, wherein the $H_2S$ concentrated gas stream is preheated in preheater E-2 to about 400° F. to 600° F. prior to entering the oxygen eliminator/sulfur converter R-1. Oxygen in the acid gas is catalytically reacted in R-1 with $H_2S$ from the recycle stream to form $H_2O$ and $SO_2$. As in the process described above, some of the $SO_2$ will also catalytically react with $H_2S$ to form additional elemental sulfur in accordance with the Claus reaction. Typical operating temperature range in R-1 is between 350° F. and 800° F. It should further be recognized that the amount of the $H_2S$ recycle gas may be adjusted to allow removal of the oxygen and/or to achieve maximum reaction with $SO_2$ (within the operating temperature limitation of the catalyst). Suitable catalysts for the second catalytic reactor include all known catalysts that catalyze the reaction between hydrogen sulfide and sulfur dioxide to form elemental sulfur, and particularly preferred catalysts include commercially available Claus catalysts. For example, appropriate Claus catalysts include alumina and/or titania based catalysts.

The so formed oxygen-depleted (and most typically oxygen free) gas leaving R-1 is then cooled via sulfur condenser E-4 to allow for recovery of the previously formed elemental sulfur. A portion of the sulfur condenser effluent is directed to a downstream Claus reactor R-2, while the balance is mixed with gas streams recycled from the downstream sulfur condenser E-5 and amine absorber C-1 prior to entering the hydrogenation reactor R-3. The latter stream is preferably combined with a hot hydrogen and carbon monoxide containing gas (e.g., from a reducing gas generator E-1 or an alternate $H_2$ source). An effluent cooler or a preheater may be employed as needed. The combined gas stream is typically in a temperature range of 400° F. to 600° F. to facilitate the catalytic reaction in the hydrogenation reactor R-3 (the hydrogen and/or carbon monoxide containing gas stream introduced into R-3 is preferably used to facilitate the direct hydrogenation reactions of $SO_2$, $SO_3$, sulfur vapor, and other sulfur constituents). Thus, the operating temperature range of R-3 is typically between 400° F. and 850° F. The amount of recycle gases from the sulfur condenser E-5 and amine absorber C-1 is preferably adjusted to yield an operating temperature of the R-3 gas effluent at about 600° F. to 850° F.

Such configurations advantageously ensure catalytic hydrogenation of $SO_2$, $SO_3$, elemental sulfur vapor, and other sulfur constituents to $H_2S$ in the presence of hydrogen (depending on gas compositions and operating conditions, normally all $SO_2$, SO3, elemental sulfur and other sulfur constituents will be hydrogenated into $H_2S$ in this operation step). The gas effluent from R-3 is then cooled in the gas effluent cooler E-3 (e.g. via steam generation), and water condensate is removed via knockout drum V-1. Alternatively, the two process steps of E-3 and V-1 could be accomplished using a direct contact condenser. The cooled effluent gas then enters the Amine Absorber C-1 for removal of the $H_2S$ prior to discharge into the atmosphere or incinerator/stack (and optional recycle into R-3).

The $H_2S$ rich amine is regenerated in an amine regenerator C-2 prior to its recycling to the amine absorber C-1. A portion of the regenerator overhead gas effluent predominantly contains $H_2S$ and is mixed with the $SO_2$ containing gas from the sulfur condenser E-4 prior to entering the gas reheater E-6. It should be noted that at least one of the amount of the $SO_2$ containing stream and the $H_2S$ containing gas are preferably adjusted relative to each other to yield a $H_2S/SO_2$ ratio of 2 to 1 so as to facilitate the Claus reaction in the Claus converter R-2.

In further preferred aspects of the inventive subject matter, a portion of the overhead gas effluent of the amine regenerator C-2 is mixed with the oxygen free $SO_2$ containing effluent gas from the sulfur condenser E-4 (again, the amount of the $SO_2$ containing stream will be adjusted to yield a $H_2S/SO_2$ ratio of 2 to 1 so as to facilitate the Claus reaction in the Claus converter R-2). The so combined stream is then reheated to about 400° F. to 440° F., via a Reheater E-6 prior to entering the Claus Reactor R-2, in which $H_2S$ reacts with $SO_2$ in accordance with the Claus reaction to form elemental sulfur. The so formed elemental sulfur is removed via a Sulfur Condenser E-5, and the cooled gas effluent from E-5 is recycled to the Hydrogenator R-3. The balance of the overhead effluent of C-2 is recycled via a Recycle Compressor P-1 for upstream operation of R-1.

It should be particularly recognized that contemplated processes will be especially useful to remove oxygen from the $SO_2$ and $SO_3$ containing gas streams (e.g., regenerator off gases from the ConocoPhillips S Zorb Desulfurization process, FCC flue gases, Coker flue gases, power plant flue gases, and metal smelter off-gases, etc). Moreover, in previous configurations and methods as described in our copending application (serial number PCT/US04/12599), the gas treatment operation is improved by eliminating the direct-fire step while removing oxygen catalytically. In these configurations, the catalyst promotes the reaction between oxygen, $H_2S$ and $SO_2$ to yield an oxygen free gas. However, while numerous advantages are achieved with such systems, they nevertheless require a subsequent amine step to take care of the $H_2S$ such that sulfur could be recovered. In an alternative configuration, as described in our copending application, elemental sulfur is removed from the effluent gas of the oxygen eliminator/sulfur converter and an appropriate portion of this effluent gas is introduced into a subsequent Claus reactor while the balance of the effluent gas goes to a downstream hydrogenation reaction. In contrast, in present contemplated configurations and methods, an amine unit is integrated to reduce the amount of recycled inert gas and to thereby achieve a substantial decrease in equipment sizes while at the same time the sulfur recovery is raised to about 99.9+%.

Figure 3:
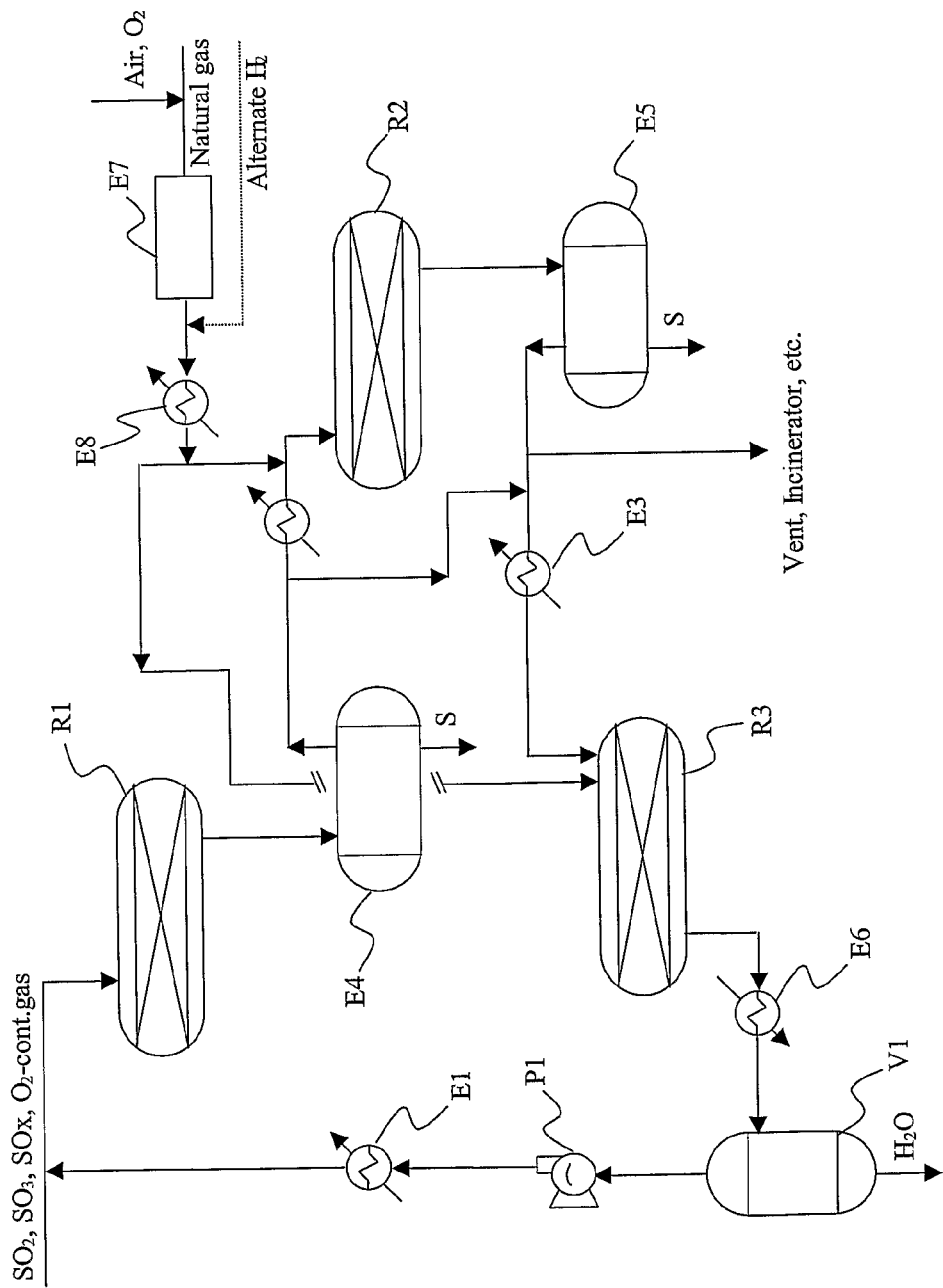
FIG. 3 is an exemplary configuration of a desulfuration plant in which the second catalytic reactor is operated as a catalytic direct reduction reactor.

In a still further preferred aspect of the inventive subject matter, as exemplarily depicted in FIG. 3, the second catalytic reactor is operated as a direct reduction reactor in which sulfurous compounds are catalytically reduced to elemental sulfur, and from which the desulfurized gas is vented or fed to a further desulfurization stage.

Here, $SO_2$, $SO_3$, and oxygen containing gases at about or pre-heated to about 400° F. to 600° F. are introduced into an oxygen eliminator/sulfur converter R-1. $H_2S$ containing gas is recycled from knock out drum V-1, and is preferably compressed via compressor P-1 and preheated in Preheater E-1 to a temperature of about 400° F. to 600° F. prior to entering the oxygen eliminator/sulfur converter R-1. Oxygen from the $SO_2$, $SO_3$, and oxygen containing gas is then catalytically reacted with $H_2S$ to form $H_2O$ and $SO_2$. Once more, it should be appreciated that a portion of the $SO_2$ will also catalytically react with $H_2S$ to form elemental sulfur in accordance with the Claus reaction. The operating temperature range in the R-1 is typically between 350° F. and 800° F. It should further be appreciated that the amount of $H_2S$ recycled gas can be adjusted to allow removal of all oxygen species and/or to allow reaction with a maximum amount of $SO_2$ within the operating temperature limitation of the catalyst.

The so prepared oxygen-depleted (and most preferably oxygen-free) gas is then cooled via a sulfur condenser E-4 to allow recovery of the elemental sulfur. A portion of the sulfur condenser E-4 effluent is directed to a downstream SOx direct reduction reactor R-2, while the balance is directed to the hydrogenation reactor R-3. The former stream is combined with a hot hydrogen and carbon monoxide containing gas from either a reducing gas generator E-7, or an alternate $H_2$ source. Depending on the particular configuration, E-8 will then operate as an effluent cooler for E-7 or as a preheater for the hydrogen stream from the alternate source. The combined gas stream will typically be in a temperature range of 350° F. to 850° F. to facilitate the catalytic reactions of SOx with hydrogen to form elemental sulfur in the direct reduction reactor R-2. It should be noted that over 90% conversion of SOx to elemental sulfur is expected in this single direct reduction step. There are numerous know catalysts for direct reduction of sulfur oxides and other sulfur compounds known in the art, and all of them are deemed suitable for use herein. However, especially preferred catalysts include those described in U.S. Pat. Nos. 6,214,311 and 5,384,301, both of which are incorporated by reference herein.

The so formed elemental sulfur is then removed from the sulfur condenser E-5, and a portion of the cooled gas effluent from E-5 is directed either to the atmosphere, incinerator, and/or stack for disposal. The balance of the gas effluent from E-5 is combined with the SOx containing gas from the sulfur condenser E-4 and reheated via reheater E-3. This combined stream is then admixed (inside or upstream of R3) with a hot hydrogen and carbon monoxide containing gas (e.g., from a Reducing Gas Generator E-7, or alternate $H_2$ source). Again, depending on the particular configuration, E-8 will then operate as an effluent cooler for E-7 or as a preheater for the hydrogen stream from the alternate source. It should be recognized that the hydrogen and/or carbon monoxide containing gas stream that is introduced into R-3 is employed to facilitate direct hydrogenation reaction of $SO_2$, $SO_3$, sulfur vapor, and other sulfur constituents to form $H_2S$. Preferably, the operating temperature range of R-3 is between 400° F. and 850° F. Moreover, it should be appreciated that the amount of recycle gas from the upstream sulfur condenser E-5 may be adjusted to yield an operating temperature of the R-3 gas effluent at 600° F.-850° F.

It is contemplated that the hydrogenation reaction in R-3 will catalytically hydrogenate $SO_2$, $SO_3$, elemental sulfur vapor, and other sulfur constituents to $H_2S$ in the presence of hydrogen and carbon monoxide. Depending on the gas composition and operating conditions, it is preferred that all of the $SO_2$, $SO_3$, elemental sulfur, and the other sulfur constituents are converted into $H_2S$ in this step. The gas effluent from R-3 is then cooled in the gas effluent cooler E-6 to produce water condensate, which is then removed from the cooled effluent via knockout drum V-1. Alternatively, the two process steps of E-6 and V-1 could be accomplished via a direct contact condenser. The so generated cooled gas stream containing $H_2S$ is then directed via recycle compressor P-1 to the oxygen eliminator R-1 to facilitate removal of oxygen from the SOx containing feed gas.

It should be recognized that in configurations in which the second catalytic reactor is operated as a direct reduction reactor, SOx is directly converted into elemental sulfur via reaction between SOx and hydrogen while at the same time the amount of gas passing through the hydrogenation reactor (and with that the amount of the needed recycling gas) is reduced as all or almost all of the desulfurized gas leaving the second catalytic reactor is vented or otherwise removed from the desulfuration plant. Additionally, it should be noted that the direct reduction process is not limited by chemical equilibrium as is the case in the Claus reaction. Consequently, such process will allow for higher sulfur conversion/recovery in a single step (sulfur recovery in form of elemental sulfur is typically achieved at a level of 90%+), which leads to a significant reduction in the size of process equipment and power consumption. Remarkably, most advantages in such configurations are achieved by simplification of the process scheme along with catalytic oxygen removal at relatively low temperature. Incidentally, contemplated configurations and methods also allow SOx containing gases to contain any level of oxygen and can be operated without the need of an amine step to recover the $H_2S$.

Therefore, a method of treating an acid gas will include one step in which an oxygen-containing acid gas comprising sulfur dioxide is catalytically converted to an oxygen-depleted gas using hydrogen sulfide from a recycle gas. In another step, a first portion of the oxygen-depleted gas is catalytically converted to elemental sulfur, while in yet another step, a second portion of the oxygen depleted gas is catalytically converted to form the recycle gas.

It should be especially appreciated that in contemplated configurations and methods sulfur dioxide can be removed from a feed gas containing even relatively high concentrations of oxygen. Moreover, contemplated configurations and methods also eliminate the need for a solvent-based process to remove hydrogen sulfide that was formed from the sulfur dioxide. Further advantages include reduction in size of the hydrogenation reactor, and catalytic removal of oxygen using moderate temperatures.

While it is generally contemplated that numerous sulfur dioxide bearing gas streams can be treated with the configurations and methods according to the inventive subject matter, it is typically preferred that such processes and configurations are employed to remove SOx from oxygen-containing gas streams, and especially from regenerator off gases from ConocoPhillips S Zorb Desulfurization processes, FCC flue gases, Coker flue gases, smelter furnace off-gases, and/or power plant flue gases. Therefore, contemplated acid gases include those comprising sulfur dioxide in a concentration between about 0.5 vol % to about 40 vol %, more typically between about 1.5 vol % to about 15 vol %, and most typically between about 5 vol % to about 10 vol %. Depending on the source of the oxygen-containing acid gas comprising sulfur dioxide, the oxygen concentration may be equal or greater than 1 vol %, more typically equal or greater than 2 vol %, even more typically equal or greater than 5 vol %, and most typically equal or greater than 10 vol %.

Thus, specific embodiments and applications of improved configurations and methods for effluent gas treatment have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of treating an acid gas, comprising:
providing from an off-gas source an oxygen-containing acid gas comprising sulfur dioxide, wherein the off-gas source is selected from the group consisting of a catalyst regenerator, a fluid catalytic cracking (FCC) unit, a coking unit, a smelter furnace and a power plant furnace;
using hydrogen sulfide in a first portion of a recycle gas to catalytically react oxygen in the oxygen-containing acid gas comprising sulfur dioxide to form an oxygen-depleted gas comprising the sulfur dioxide and hydrogen sulfide;
catalytically reacting a first portion of the oxygen-depleted gas comprising sulfur dioxide and hydrogen sulfide in a Claus reaction with a second portion of the recycle gas to form a treated gas and elemental sulfur; and
catalytically reacting a second portion of the oxygen depleted gas comprising sulfur dioxide and hydrogen sulfide with a reducing gas to thereby form the recycle gas.

2. The method of claim 1 wherein the step of catalytically reacting the oxygen-containing acid gas comprises a catalytic reaction using a catalyst selected from the group consisting of an alumina catalyst, a titanium oxide catalyst, a vanadium-antimony catalyst, and a direct oxidation catalyst.

3. The method of claim 1 wherein after the step of catalytically reacting the second portion of the oxygen depleted gas comprising sulfur dioxide and hydrogen sulfide, inert gas is removed to thereby form the recycle gas.

4. A plant comprising:
an off-gas source configured to provide an oxygen-containing acid gas comprising sulfur dioxide, wherein the off-gas source is selected from the group consisting of a catalyst regenerator, a fluid catalytic cracking (FCC) unit, a coking unit, a smelter furnace and a power plant furnace;
a first catalytic reactor receiving a first portion of a hydrogen sulfide recycle stream and the oxygen-containing acid gas comprising sulfur dioxide;
wherein the first catalytic reactor is configured to catalytically consume the oxygen using hydrogen sulfide in the first portion of the hydrogen sulfide recycle stream to thereby form an oxygen depleted hydrogen sulfide/sulfur dioxide enriched stream;
a second catalytic reactor fluidly coupled to the first catalytic reactor and configured to produce elemental sulfur in a Claus reaction from a first portion of the oxygen depleted hydrogen sulfide/sulfur dioxide enriched stream and a second portion of the hydrogen sulfide recycle stream; and
a third catalytic reactor fluidly coupled to the first and second catalytic reactors, and configured to produce the hydrogen sulfide recycle stream from a reducing gas and a second portion of the oxygen depleted hydrogen sulfide/sulfur dioxide enriched stream.

5. The plant of claim 4 wherein the first catalytic reactor comprises a catalyst selected from the group consisting of an alumina catalyst, a titanium oxide catalyst, a vanadium-antimony catalyst, and a direct oxidation catalyst.

6. The plant of claim 4 further comprising a sulfur condenser downstream of at least one of the first catalytic reactor and second catalytic reactor.

7. The plant of claim 4 further comprising a reducing gas generator fluidly coupled to the third catalytic reactor and that provides hydrogen as the reducing gas to at least one of the third catalytic reactor and the second portion of the oxygen depleted hydrogen sulfide/sulfur dioxide enriched stream.

8. The plant of claim 4 further comprising an absorber and regenerator fluidly coupled to the third catalytic reactor, wherein the absorber is configured such that a solvent in the absorber absorbs hydrogen sulfide from an effluent of the third catalytic reactor, and wherein the regenerator is configured such that the solvent is regenerated to thereby produce the hydrogen sulfide recycle stream.

9. The plant of claim 8 wherein inert gas is vented from the absorber.

10. The plant of claim 4 further comprising a sulfur condenser that removes sulfur from an effluent of the second catalytic reactor, and wherein inert gas is vented from the sulfur condenser.

11. The plant of claim 4 further comprising a sulfur condenser that removes sulfur from an effluent of the second catalytic reactor, and an offgas from the sulfur condenser is fed to the third catalytic reactor.

* * * * *